United States Patent
Buzzard et al.

(10) Patent No.: US 10,875,566 B2
(45) Date of Patent: Dec. 29, 2020

(54) STOW RELEASE ASSEMBLY FOR A MANUALLY ADJUSTABLE STEERING COLUMN ASSEMBLY

(71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US); John F. Schulz, Hemlock, MI (US); Robert C. Derocher, Essexville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 233 days.

(21) Appl. No.: 15/928,914

(22) Filed: Mar. 22, 2018

(65) Prior Publication Data
US 2019/0291774 A1   Sep. 26, 2019

(51) Int. Cl.
| | |
|---|---|
| *B62D 1/19* | (2006.01) |
| *B62D 1/183* | (2006.01) |
| *B62D 1/184* | (2006.01) |
| *B62D 1/187* | (2006.01) |
| *B62D 1/185* | (2006.01) |

(52) U.S. Cl.
CPC ............ *B62D 1/183* (2013.01); *B62D 1/184* (2013.01); *B62D 1/185* (2013.01); *B62D 1/187* (2013.01); *B62D 1/195* (2013.01)

(58) Field of Classification Search
CPC ........ B62D 1/185; B62D 1/184; B62D 1/187; B62D 1/195; B62D 1/183

USPC .................................. 74/492, 493; 280/777
See application file for complete search history.

(56) References Cited

U.S. PATENT DOCUMENTS

| | | | |
|---|---|---|---|
| 2,331,996 | A | 10/1943 | Maurer |
| 4,138,167 | A | 2/1979 | Ernst et al. |
| 4,315,117 | A | 2/1982 | Kokubo et al. |
| 4,337,967 | A | 7/1982 | Yoshida et al. |
| 4,402,236 | A | 9/1983 | Nishikawa |
| 4,503,300 | A | 3/1985 | Lane, Jr. |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

English Translation of DE102015216326; ThyssenKrupp; 21 pgs.

(Continued)

*Primary Examiner* — Toan C To
(74) *Attorney, Agent, or Firm* — Dickinson Wright PLLC

(57) ABSTRACT

A stow release assembly for a manually translatable steering column assembly includes an upper jacket. The stow release assembly also includes a lower jacket, the upper jacket translatable relative to the lower jacket, the upper jacket translatable between a retracted range and a stowed range. The stow release assembly further includes an electromechanical blocking element coupled to a stationary component of the steering column assembly and moveable between an extended position and a retracted position, the electromechanical blocking element selectively preventing translation of the upper jacket at a plurality of translation positions.

12 Claims, 5 Drawing Sheets

(56) References Cited

U.S. PATENT DOCUMENTS

| | | | |
|---|---|---|---|
| 4,503,504 A | 3/1985 | Suzumura et al. | |
| 4,561,323 A | 12/1985 | Stromberg | |
| 4,691,587 A | 9/1987 | Farrand et al. | |
| 4,836,566 A | 6/1989 | Birsching | |
| 4,921,066 A | 5/1990 | Conley | |
| 4,962,570 A | 10/1990 | Hosaka et al. | |
| 4,962,944 A | 10/1990 | Reiche et al. | |
| 4,967,618 A | 11/1990 | Matsumoto et al. | |
| 4,976,239 A | 12/1990 | Hosaka | |
| 5,009,120 A * | 4/1991 | Iseler | B62D 1/184 280/775 |
| 5,186,573 A | 2/1993 | Flotow | |
| 5,240,284 A | 8/1993 | Takada et al. | |
| 5,295,712 A | 3/1994 | Omura | |
| 5,311,432 A | 5/1994 | Momose | |
| 5,319,803 A | 6/1994 | Allen | |
| 5,488,555 A | 1/1996 | Asgari | |
| 5,618,058 A | 4/1997 | Byon | |
| 5,668,721 A | 9/1997 | Chandy | |
| 5,690,362 A | 11/1997 | Peitsmeier et al. | |
| 5,765,116 A | 6/1998 | Wilson-Jones et al. | |
| 5,820,163 A | 10/1998 | Thacker et al. | |
| 5,893,580 A | 4/1999 | Hoagland et al. | |
| 5,911,789 A | 6/1999 | Keipert et al. | |
| 6,070,686 A | 6/2000 | Pollmann | |
| 6,170,862 B1 | 1/2001 | Hoagland et al. | |
| 6,277,571 B1 | 5/2001 | Sheng et al. | |
| 6,301,534 B1 | 10/2001 | McDermott, Jr. | |
| 6,354,622 B1 | 3/2002 | Ulbrich et al. | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 | 5/2002 | Wilson | |
| 6,578,449 B1 | 6/2003 | Anspaugh et al. | |
| 6,611,745 B1 | 8/2003 | Paul | |
| 6,612,393 B2 | 9/2003 | Bohner et al. | |
| 6,819,990 B2 | 11/2004 | Ichinose | |
| 7,021,416 B2 | 4/2006 | Kapaan et al. | |
| 7,048,305 B2 | 5/2006 | Muller | |
| 7,062,365 B1 | 6/2006 | Fei | |
| 7,295,904 B2 | 11/2007 | Kanevsky et al. | |
| 7,308,964 B2 | 12/2007 | Hara et al. | |
| 7,428,944 B2 | 9/2008 | Gerum | |
| 7,461,863 B2 | 12/2008 | Muller | |
| 7,495,584 B1 | 2/2009 | Sorensen | |
| 7,628,244 B2 | 12/2009 | Chino et al. | |
| 7,665,767 B2 * | 2/2010 | Olgren | B62D 1/184 280/775 |
| 7,719,431 B2 | 5/2010 | Bolourchi | |
| 7,735,405 B2 | 6/2010 | Parks | |
| 7,793,980 B2 | 9/2010 | Fong | |
| 7,862,079 B2 | 1/2011 | Fukawatase et al. | |
| 7,894,951 B2 | 2/2011 | Norris et al. | |
| 7,909,361 B2 | 3/2011 | Oblizajek et al. | |
| 8,002,075 B2 | 8/2011 | Markfort | |
| 8,027,767 B2 | 9/2011 | Klein et al. | |
| 8,055,409 B2 | 11/2011 | Tsuchiya | |
| 8,069,745 B2 | 12/2011 | Strieter et al. | |
| 8,079,312 B2 | 12/2011 | Long | |
| 8,146,945 B2 | 4/2012 | Born et al. | |
| 8,170,725 B2 | 5/2012 | Chin et al. | |
| 8,260,482 B1 | 9/2012 | Szybalski et al. | |
| 8,352,110 B1 | 1/2013 | Szybalski et al. | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,634,980 B1 | 1/2014 | Urmson et al. | |
| 8,650,982 B2 | 2/2014 | Matsuno et al. | |
| 8,670,891 B2 | 3/2014 | Szybalski et al. | |
| 8,695,750 B1 | 4/2014 | Hammond et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,108,584 B2 | 8/2015 | Rao et al. | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,164,619 B2 | 10/2015 | Goodlein | |
| 9,174,642 B2 | 11/2015 | Wimmer et al. | |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Yamaguchi | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,333,983 B2 | 5/2016 | Lathrop et al. | |
| 9,352,752 B2 | 5/2016 | Cullinane et al. | |
| 9,360,865 B2 | 6/2016 | Yopp | |
| 9,630,644 B2 | 4/2017 | Soderlind | |
| 9,919,724 B2 | 3/2018 | Lubischer et al. | |
| 10,065,655 B2 | 9/2018 | Bendewald et al. | |
| 10,144,383 B2 | 12/2018 | Bodtker et al. | |
| 2003/0046012 A1 | 3/2003 | Yamaguchi | |
| 2003/0094330 A1 | 5/2003 | Boloorchi et al. | |
| 2003/0227159 A1 | 12/2003 | Muller | |
| 2004/0016588 A1 | 1/2004 | Vitale et al. | |
| 2004/0046346 A1 | 3/2004 | Eki et al. | |
| 2004/0099468 A1 | 5/2004 | Chernoff et al. | |
| 2004/0129098 A1 | 7/2004 | Gayer et al. | |
| 2004/0204808 A1 | 10/2004 | Satoh et al. | |
| 2004/0262063 A1 | 12/2004 | Kaufmann et al. | |
| 2005/0001445 A1 | 1/2005 | Ercolano | |
| 2005/0081675 A1 | 4/2005 | Oshita et al. | |
| 2005/0197746 A1 | 9/2005 | Pelchen et al. | |
| 2005/0199087 A1* | 9/2005 | Li | B62D 1/181 74/493 |
| 2005/0275205 A1 | 12/2005 | Ahnafield | |
| 2006/0005658 A1* | 1/2006 | Armstrong | B62D 1/184 74/492 |
| 2006/0224287 A1 | 10/2006 | Izawa et al. | |
| 2006/0244251 A1 | 11/2006 | Muller | |
| 2007/0021889 A1 | 1/2007 | Tsuchiya | |
| 2007/0029771 A1 | 2/2007 | Haglund et al. | |
| 2007/0046003 A1 | 3/2007 | Mori et al. | |
| 2007/0046013 A1 | 3/2007 | Bito et al. | |
| 2007/0241548 A1 | 10/2007 | Fong | |
| 2007/0284867 A1 | 12/2007 | Cymbal et al. | |
| 2008/0009986 A1 | 1/2008 | Lu et al. | |
| 2008/0028884 A1 | 2/2008 | Monash | |
| 2008/0147276 A1 | 6/2008 | Pattok et al. | |
| 2008/0217901 A1 | 9/2008 | Olgren et al. | |
| 2008/0229865 A1* | 9/2008 | Manwaring | B62D 1/184 74/493 |
| 2008/0238068 A1 | 10/2008 | Kumar et al. | |
| 2009/0024278 A1 | 1/2009 | Kondo et al. | |
| 2009/0107284 A1 | 4/2009 | Lucas et al. | |
| 2009/0256342 A1 | 10/2009 | Cymbal et al. | |
| 2009/0276111 A1 | 11/2009 | Wang et al. | |
| 2009/0292466 A1 | 11/2009 | McCarthy et al. | |

(56) References Cited

U.S. PATENT DOCUMENTS

| | | |
|---|---|---|
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1* | 12/2011 | Matsuno ............... B62D 1/181 74/493 |
| 2012/0024101 A1* | 2/2012 | Schnitzer ............. B62D 1/195 74/492 |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0325202 A1 | 1/2013 | Howard et al. |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer et al. |
| 2015/0051780 A1 | 1/2015 | Hahne |
| 2015/0120142 A1 | 1/2015 | Park et al. |
| 2015/0210273 A1 | 2/2015 | Kaufmann et al. |
| 2015/0060185 A1 | 3/2015 | Feguri |
| 2015/0246673 A1 | 4/2015 | Tseng et al. |
| 2015/0251666 A1 | 7/2015 | Attard et al. |
| 2015/0239490 A1* | 8/2015 | Sakata ............... B62D 1/195 74/493 |
| 2015/0266499 A1* | 9/2015 | Yoshihara ............. B62D 1/184 74/493 |
| 2015/0324111 A1 | 9/2015 | Jubner et al. |
| 2015/0283998 A1 | 10/2015 | Lind et al. |
| 2015/0375769 A1 | 12/2015 | Abboud et al. |
| 2015/0375771 A1* | 12/2015 | Tinnin ............... B62D 1/184 74/493 |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0200246 A1 | 3/2016 | Lisseman et al. |
| 2016/0159387 A1* | 6/2016 | Okano ............... B62D 1/184 74/493 |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0318540 A1 | 11/2016 | King |
| 2016/0318542 A1 | 11/2016 | Pattok et al. |
| 2016/0347347 A1 | 12/2016 | Lubischer et al. |
| 2016/0347348 A1 | 12/2016 | Lubischer et al. |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375860 A1 | 12/2016 | Lubischer |
| 2016/0375923 A1 | 12/2016 | Schulz et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer et al. |
| 2017/0029009 A1 | 2/2017 | Rouleau |
| 2017/0029018 A1 | 2/2017 | Lubischer et al. |
| 2017/0113712 A1 | 4/2017 | Watz |
| 2017/0341677 A1 | 11/2017 | Buzzard |
| 2018/0072339 A1 | 3/2018 | Bodtker |
| 2018/0086378 A1 | 3/2018 | Bell et al. |
| 2018/0134308 A1 | 5/2018 | Derocher |
| 2018/0148084 A1 | 5/2018 | Nash et al. |
| 2018/0251147 A1 | 9/2018 | Heitz et al. |
| 2018/0319419 A1 | 11/2018 | Kreutz et al. |
| 2018/0370559 A1 | 12/2018 | Swamidason |
| 2019/0016365 A1 | 1/2019 | Swamidason et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102452391 A | 5/2012 |
| CN | 103419840 A2 | 12/2013 |
| CN | 103448785 A | 12/2013 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102010025197 A1 | 12/2011 |
| DE | 102015216326 B4 | 9/2016 |
| EP | 1559630 A2 | 8/2005 |
| EP | 1783719 A2 | 5/2007 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | 2007253809 A | 10/2007 |
| KR | 20100063433 A | 6/2010 |
| WO | 2006099483 A1 | 9/2006 |
| WO | 2010082394 A1 | 7/2010 |
| WO | 2010116518 A1 | 10/2010 |

OTHER PUBLICATIONS

Gillespie, Thomas D.; "Fundamentals of Vehicle Dynamics"; Society of Automotive Enginers, Inc.; published 1992; 294 pages.

Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.

Van der Jagt, Pim; "Prediction of Steering Efforts During Stationary or Slow Rolling Parking Maneuvers"; Ford Forschungszentrum Aachen GmbH.; Oct. 27, 1999; 20 pages.

Varunjikar, Tejas; Design of Horizontal Curves With DownGrades Using Low-Order Vehicle Dynamics Models; A Theisis by T. Varunkikar; 2011; 141 pages.

English translation regarding DE102015216326B4, ThyssenKrupp AG; 21 pgs.

* cited by examiner

STOW RELEASE ASSEMBLY FOR A MANUALLY ADJUSTABLE STEERING COLUMN ASSEMBLY

BACKGROUND

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle. For example, a steering wheel may be retracted to a stowed position to enlarge the space available to a driver. Many vehicles with stowable columns during autonomous driving utilize power column actuators to move the column into, and away from, the stowed position. However, manually adjusted columns do not typically have stow capability.

SUMMARY OF THE INVENTION

According to one aspect of the disclosure, a stow release assembly for a manually translatable steering column assembly includes an upper jacket. The stow release assembly also includes a lower jacket, one of the upper jacket and the lower jacket translatable relative to the other of the lower jacket and the upper jacket over a first telescope range defined by a fully extended position and a first retraction limit, one of the lower jacket and the upper jacket also translatable over a second telescope range defined by the first retraction limit and a second retraction limit. The stow release assembly further includes an electromechanical blocking element coupled to a stationary component of the steering column assembly and moveable between an extended position and a retracted position, the electromechanical blocking element selectively engageable with a first wall of one of the upper jacket and the lower jacket, or a component operatively coupled to the upper jacket, to prevent retraction of the upper jacket beyond the first retraction limit when the electromechanical blocking element is in the extended position.

According to another aspect of the disclosure, a stow release assembly for a manually translatable steering column assembly includes an upper jacket. The stow release assembly also includes a lower jacket, the upper jacket translatable relative to the lower jacket, the upper jacket translatable between a retracted range and a stowed range. The stow release assembly further includes an electromechanical blocking element coupled to a stationary component of the steering column assembly and moveable between an extended position and a retracted position, the electromechanical blocking element selectively preventing translation of the upper jacket at a plurality of translation positions.

According to another aspect of the disclosure, a stow release assembly for a manually translatable steering column assembly includes an upper jacket. The stow release assembly also includes a lower jacket, one of the upper jacket and the lower jacket moveable relative to the other of the lower jacket and the upper jacket in a raking manner. The stow release assembly further includes a rake blocking element moveable between an engaged condition and a disengaged condition, the engaged condition maintaining one of the upper jacket and the lower jacket in a predefined rake range.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a steering column assembly with manual stowing capability is disclosed. The embodiments described herein may be employed with various types of steering columns. In particular, autonomous or semi-autonomous driving systems are examples of vehicle steering columns that may benefit from the embodiments disclosed herein. The term autonomous or semi-autonomous refers to vehicles or vehicle sub-systems that are configured to perform operations without continuous input from a driver (e.g., steering, accelerating, braking etc.) and may be equipped with Advanced Driver Assist Steering (ADAS) system(s) to allow the vehicle to be autonomously controlled using sensing, steering, and/or braking technology.

Figure 1:
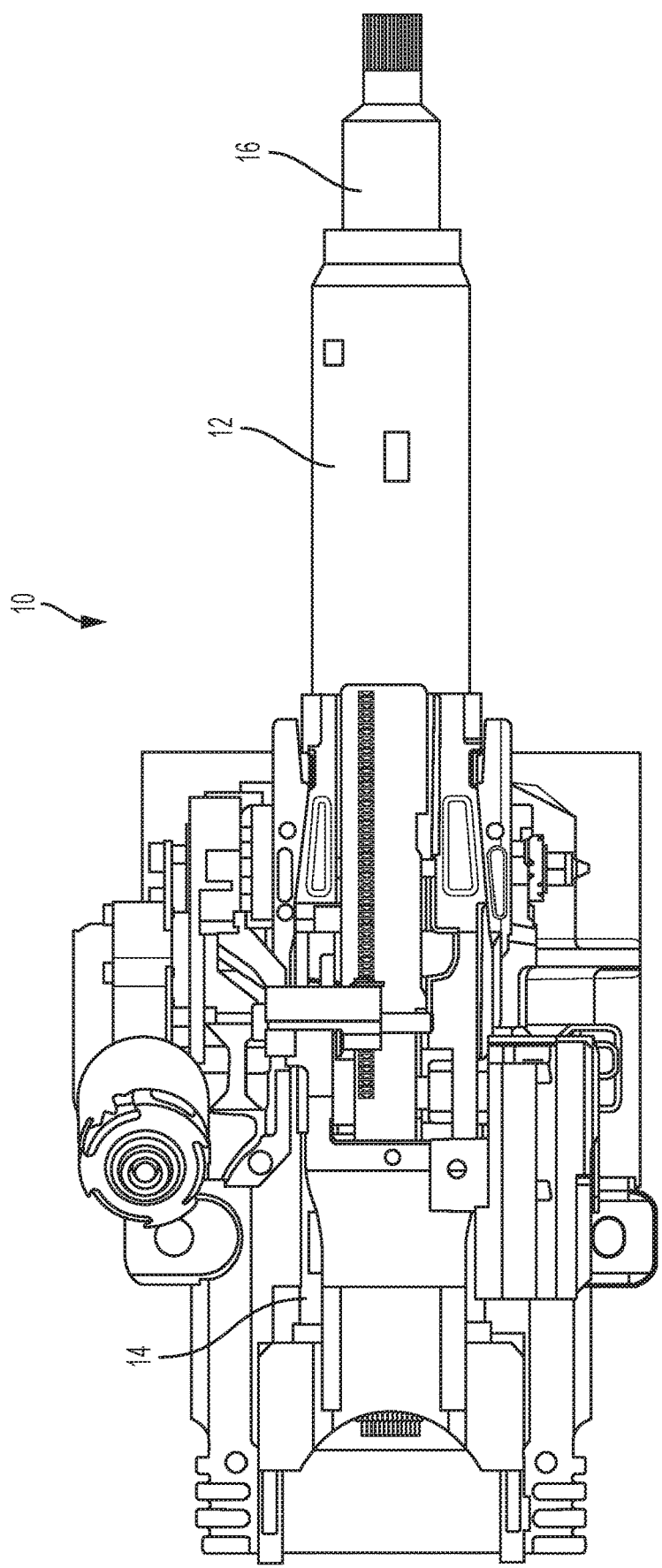
FIG. 1 is an elevational view of a steering column assembly.

Referring to FIG. 1, the steering column assembly 10 is illustrated. The steering column assembly includes an upper jacket 12 with a steering shaft 16 disposed within a central aperture of the upper jacket 12. The steering shaft 16 is coupleable with a steering input device, such as a steering wheel (not shown). The upper jacket 12 is operatively coupled to a lower jacket 14 in a telescoping manner. In particular, the upper jacket 12 telescopes forwardly toward an instrument panel of the vehicle and rearward toward a seatback that a vehicle operator may be seated in. The steering column assembly 10 may also tilt in a rake motion to adjust the angle at which the steering input device is disposed, relative to a driver. The steering column assembly 10 is operatively coupled, mechanically or electrically, to a steering gear controlled by an ADAS system, for example.

At least some components of the steering column assembly 10 are also controlled by the ADAS system in some embodiments.

As discussed above, the upper jacket 12 is telescoping, relative to the lower jacket 12. In particular, the upper jacket 12 is moveable over a first telescope range and a second telescope range. The first range of motion is defined as an un-stowed position of the steering column assembly 10. Over this range of motion, a driver of the vehicle is able to manually steer the vehicle by providing an input command via the steering wheel. Therefore, the steering column assembly 10 is retractable to a first retraction limit in the un-stowed position. This first retraction limit is a typical telescope retraction limit provided by steering column assemblies.

The second telescope range of the steering column assembly 10 allows the upper jacket 12 to be retractable to a second retraction limit that is greater than the above-describe first retraction limit. In other words, the steering column assembly 10 is retractable (i.e., translation away from driver) to a greater extent, relative to the first retraction limit. This degree of retraction is referred to herein as a stowed position of the steering column assembly 10. The second retraction limit may be a completely flush, or even recessed, orientation of the steering input device with the instrument panel. In other embodiments, the second retraction limit is defined by the steering input device being rearward of the instrument panel (i.e., steering wheel closer to the driver than the instrument panel).

Figure 3:
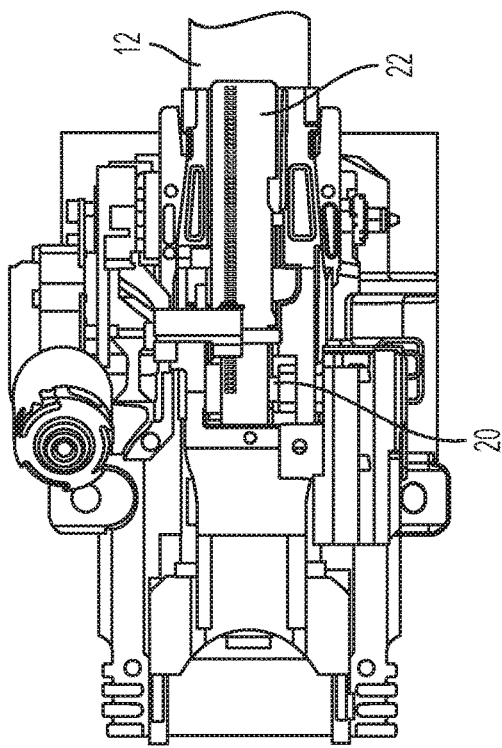
FIG. 3 is an elevational view of the steering column assembly in a second position.
Figure 4:
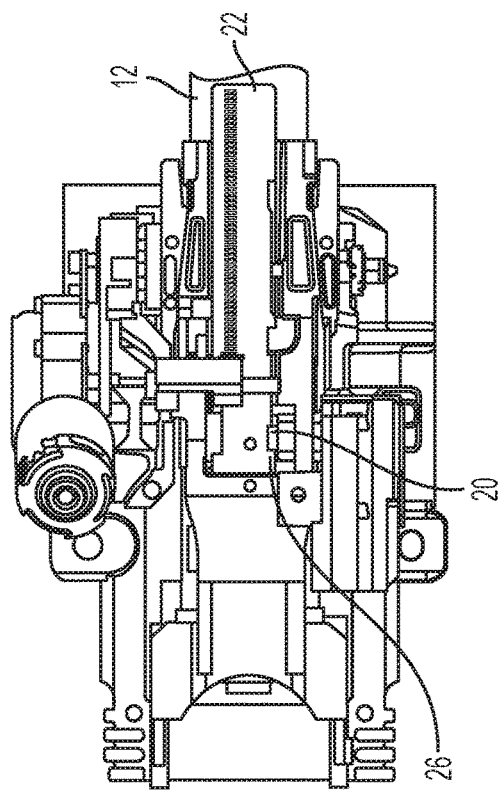
FIG. 4 is an elevational view of the steering column assembly in a third position.
Figure 2:
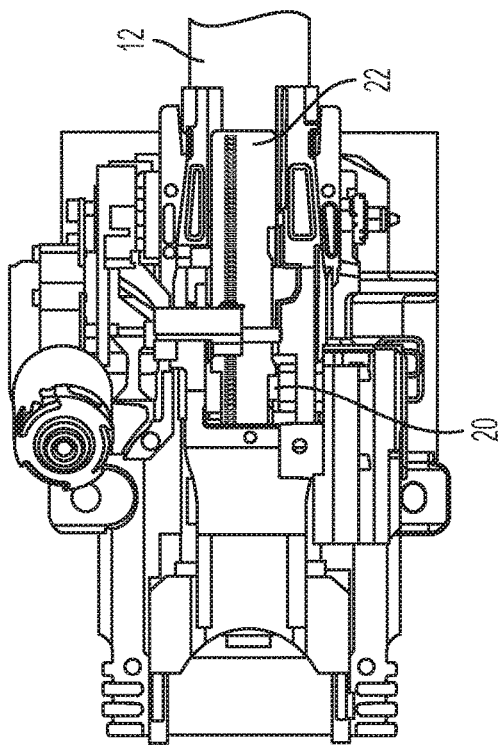
FIG. 2 is an elevational view of the steering column assembly in a first position.
Figure 5:
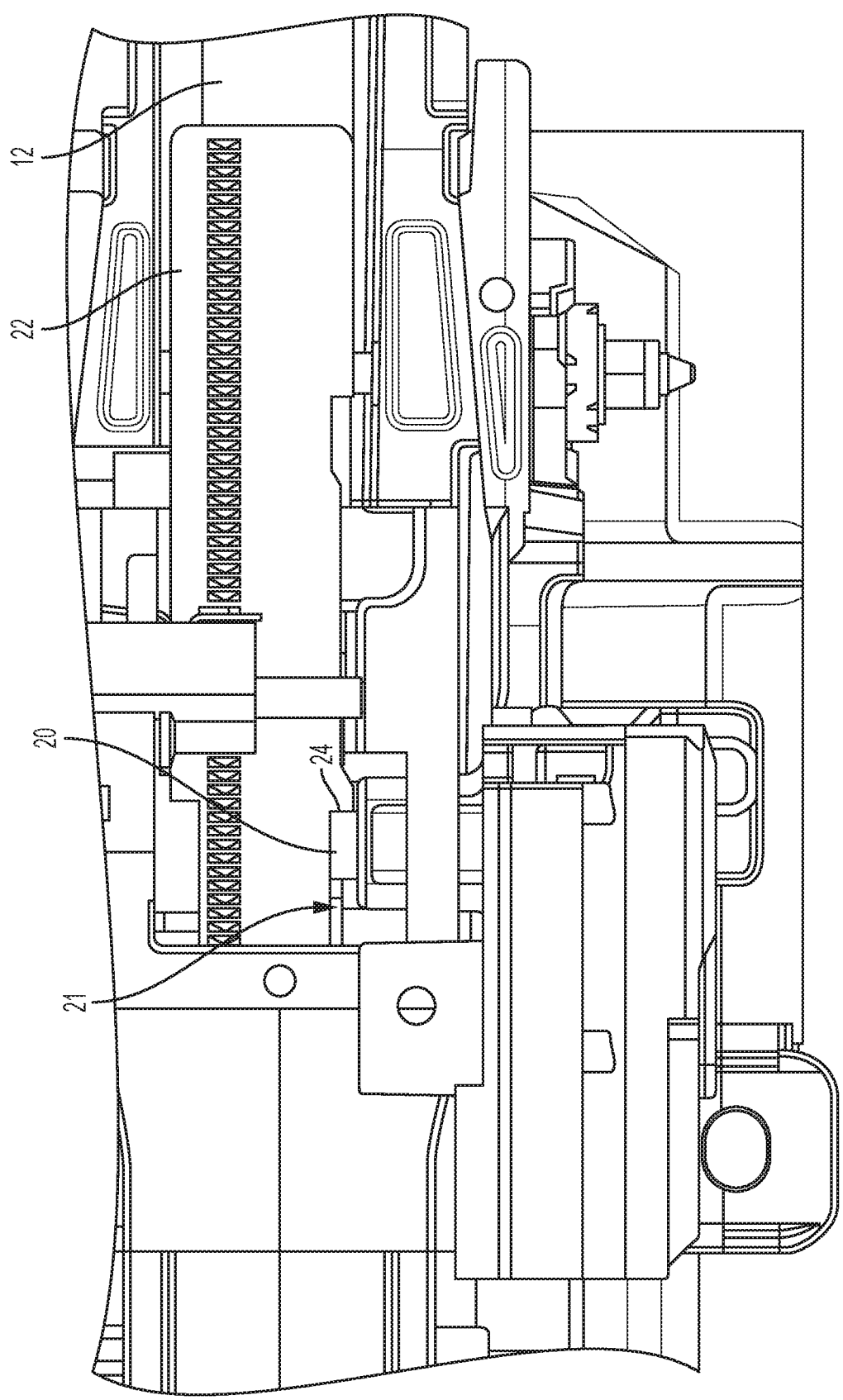
FIG. 5 is an enlarged, elevational view of a portion of the steering column assembly in the first position.

FIGS. 2-4 illustrate the upper jacket 12 in three distinct telescope positions over the first telescope range. FIGS. 2 and 5 illustrate the upper jacket 12 in the position corresponding to the first retraction limit. In this position, the upper jacket 12 is positioned as forwardly as possible in the first telescope range. An electromechanical blocking element 20 is operatively coupled to a stationary structure of the steering column assembly 10. The electromechanical blocking element 20 is moveable between an engaged condition and a disengaged condition. In the illustrated engaged condition, the electromechanical blocking element 20 is disposed within an aperture, slot, recessed feature, or the like 21 defined by a moveable portion of the steering column assembly 10, such as the upper jacket 12 or an energy absorption strap 22 that is coupled to the upper jacket 12 for telescoping movement therewith. In the illustrated embodiment, the electromechanical blocking element 20 is configured to engage one or more features of the energy absorption strap 22. In some embodiments, the electromechanical blocking element 20 is configured to engage one or more features of a frangible device, or some other type of device, permanently affixed to the upper jacket, depending on the design style of the steering column assembly.

In the position shown in FIGS. 2 and 5, the moveable portion(s) of the steering column assembly 10, such as the energy absorption strap 22 and the upper jacket 12 are not permitted to telescope forwardly into the stowed position (i.e., second telescope range). As shown, a first wall 24 of the energy absorption strap 22 is in contact with the electromechanical blocking element 20 to prevent the above-described forward telescoping movement of the upper jacket 12. The first wall 24 defines one end of the aperture, slot, recessed feature or the like 21 of the energy absorption strap 22.

FIG. 3 illustrates the upper jacket 12 in an intermediate position within the first telescope range. The intermediate position refers to a telescope position between the extreme telescope positions of the upper jacket 12 within the first telescope range.

FIG. 4 illustrates the upper jacket 12 in a fully extended position of the first telescope range. In some embodiments, a second wall 26 of the aperture, slot, recessed feature or the like 21 of the energy absorption strap 22 is provided as the feature that limits further rearward extension of the upper jacket 12, or this may be a redundant stop feature. The upper jacket 12 is manually translatable over the first telescope range shown in FIGS. 2-5. This may be done in any suitable manner, including clamping mechanisms actuated by any manual control feature.

As described above in connection with FIGS. 2 and 5, contact between the electromechanical blocking element 20 and the first wall 24 prevents forward movement of the upper jacket forwardly beyond the first telescope limit, out of the first telescope range. To facilitate movement of the upper jacket 12 to the second telescope range (i.e., forwardly beyond the first retraction limit), the electromechanical blocking element 20 must be moved out of engagement with the first wall 24 to a disengaged condition. In the disengaged condition, the electromechanical blocking element 20 is retracted to a position radially outward of the edge of the first wall 24. In this condition, the moveable portion(s) of the steering column assembly 10 are permitted to transition from the un-stowed position to the stowed position, or to intermediate positions therebetween. The electromechanical blocking element 20 is actuated by any suitable mechanism. The element 20 may be cable, linkage, gear, or solenoid driven or actuated, for example. The element 20 is spring biased toward the extended position in some embodiments. In addition to locking or unlocking the steering column assembly 10, the element 20, with corresponding position sensor(s) (not shown), verifies the actual position of the steering column assembly 10, or the degree of engagement of element 20 and thus the position of the steering column steering column assembly 10, in either the stowed or un-stowed position.

Figure 6:
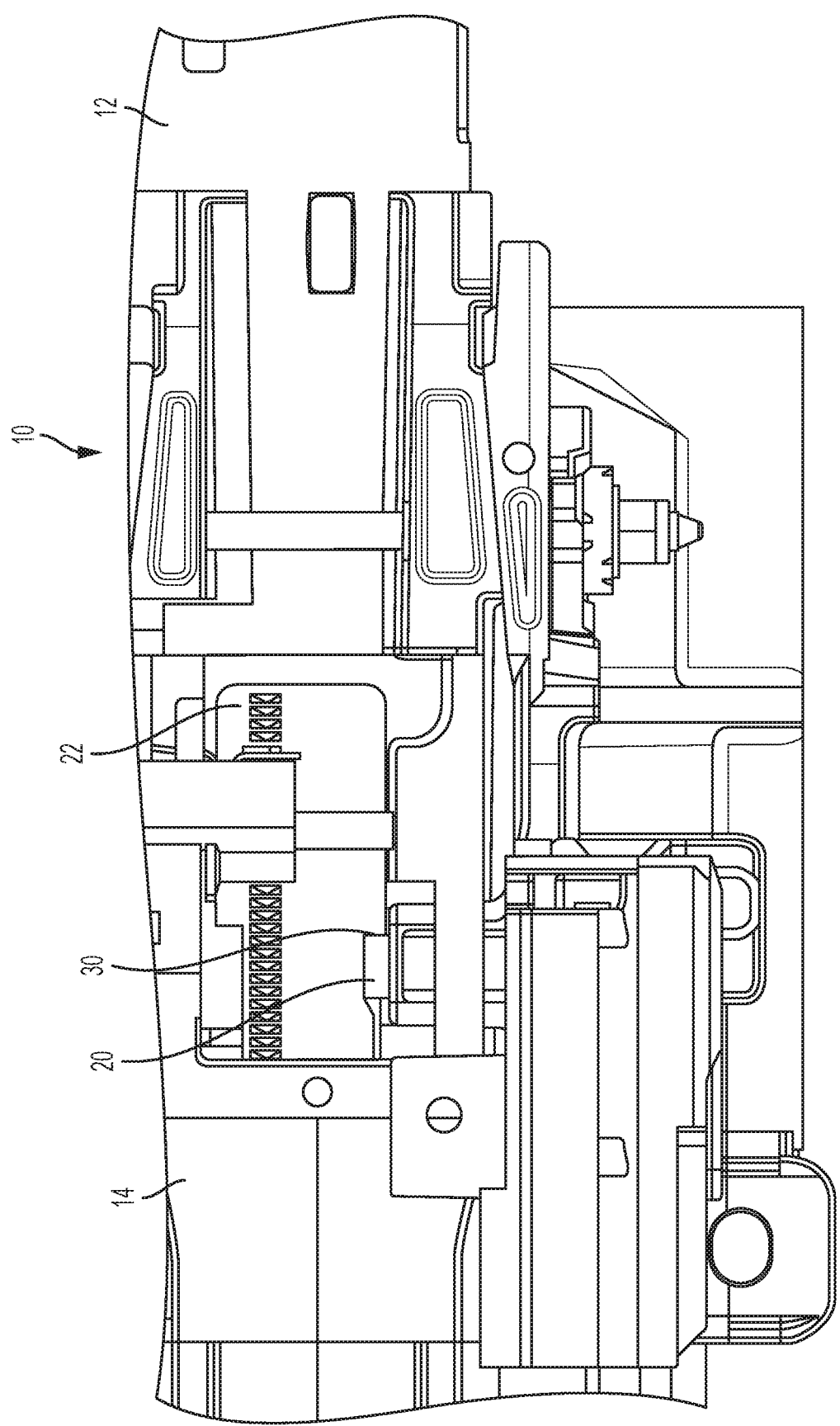
FIG. 6 is an enlarged, elevational view of a portion of the steering column assembly in a fully retracted position.

FIG. 6 illustrates the steering column assembly 10 in the stowed position at the second retraction limit of the upper jacket 12. This position, and all positions of the second telescope range, are accessible upon retraction of the electromechanical blocking element 20, which allows movement past the first telescope limit as described in detail above. Permissibility of the electromechanical blocking element 20 retraction is dependent upon vehicle control logic, such as via the ADAS system(s), which determines the suitability of the stowed position, taking into account various parameters. The parameters may include, but are not limited to, vehicle speed and vehicle operator conditions.

Once in the second telescope range, the electromechanical blocking element 20 is extended once more to engage a third wall 30 which defines the second retraction limit of the upper jacket 12. This provides an optimized stow position for the steering column assembly 10, with driver reach and hand clearance considerations, that is rearward of a maximum crash stroke position. As described, the electromechanical blocking element 20 prevents forward movement beyond the second retraction limit to define a fully stowed position. In some embodiments, the electromechanical blocking element 20 may be configured to contact an additional feature of the energy absorption strap 22 to block un-stowing of the steering column assembly 10. This may be beneficial if the ADAS system(s) determine that switching to manual steering control is inadvisable.

In some embodiments, there are one or more other discrete positions within the second telescope range at which the electromechanical blocking element 20 fixes the position of the upper jacket 12. Such positions are referred to as stowed when forward of the first retraction limit, but not fully stowed to the second retraction limit. Stowed positions that are not fully stowed sacrifice some of the extra available driver compartment space in order to improve driver access to the steering wheel and/or establish position with a targeted amount of available energy absorbing displacement.

In any of the positions described herein, (stowed, unstowed, not fully stowed, etc.) multiple options are available regarding the functionality of the steering wheel. For example, the steering wheel may remain in a stationary angular position when the vehicle is in the autonomous driving mode to avoid distraction or inconvenience to the driver. Additionally, the autonomous driving mode may be available in any of the positions.

Figure 8:
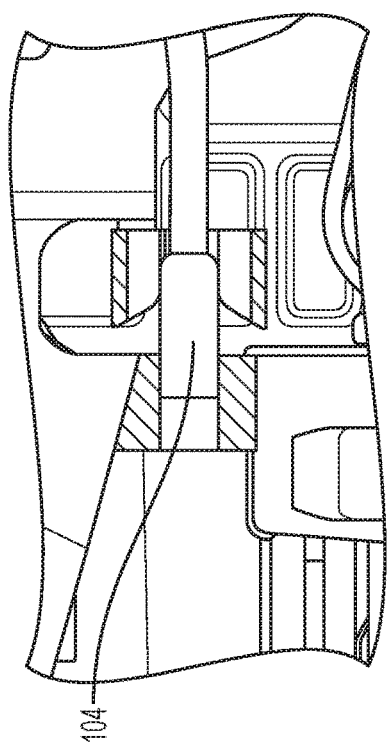
FIG. 8 is an enlarged, elevational view of a portion of the rake control assembly illustrating a rake blocking element in an engaged condition.
Figure 9:
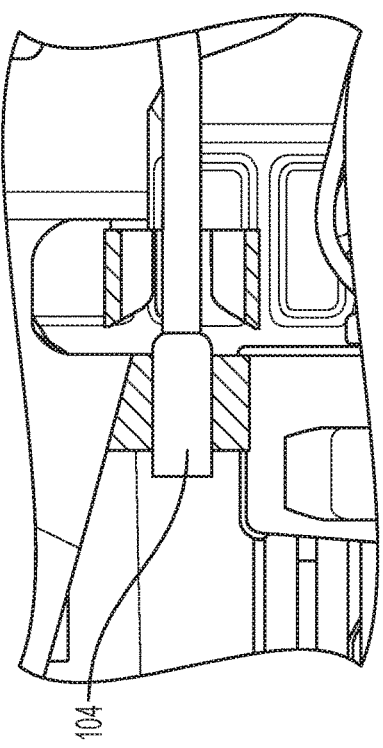
FIG. 9 is an enlarged, elevational view of a portion of the rake control assembly illustrating the rake blocking element in a disengaged condition.
Figure 7:
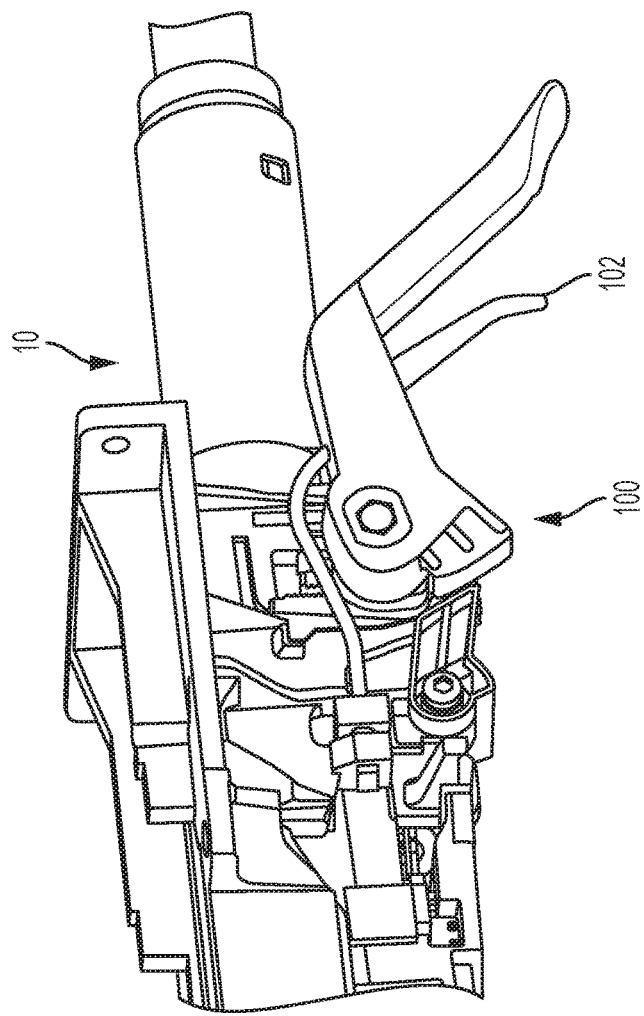
FIG. 7 is a perspective view of a rake control assembly of the steering column assembly.

Referring now to FIGS. 7-9, a rake control assembly 100 is illustrated. The rake control assembly is a guiding feature that establishes a targeted rake adjust position during stowing of the steering column assembly 10. As shown in FIG. 7, a stow lever 102 is used to manually actuate stowing of the steering column assembly 10. Actuation of the stow lever 102 is restricted until the steering column assembly 10 is placed within a defined rake position or zone. The stow lever 102 is part of a mechanism that ratchets or actuates to keep a rake blocking element 104 engaged while the steering column assembly 10 is in the stowed position (or partially stowed position). FIG. 8 illustrates the rake blocking element 104 in an engaged condition and FIG. 9 illustrates the rake blocking element 104 in a disengaged condition.

The mechanism resets when the driver returns the steering column assembly to the first telescope range (i.e., unstowed). Although a fully manual embodiment is illustrated, it is to be appreciated that some embodiments include an electromechanical blocking feature. The controlled rake position, when stowed, simplifies the design of the instrument panel to steering column and steering wheel interfaces and can be used to secure a rake position without the need of high clamp load or a fully locked clamp lever which can be used to minimize time for un-stowing. Additionally, the controlled rake position, when stowed, can be used as a way to verify driver intent to place the steering column assembly 10 into the stowed range. The control allows complete crash stroke, without funneling to a specific rake position when a crash starts from the conventional driving adjustment range.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A stow release assembly for a manually translatable steering column assembly comprising:
   an upper jacket;
   a lower jacket, one of the upper jacket and the lower jacket translatable relative to the other of the lower jacket and the upper jacket over a first telescope range defined by a fully extended position and a first retraction limit, one of the lower jacket and the upper jacket also translatable over a second telescope range defined by the first retraction limit and a second retraction limit; and
   an electromechanical blocking element coupled to a stationary component of the steering column assembly and moveable between an extended position and a retracted position, the electromechanical blocking element selectively engageable with a first wall of a component operatively coupled to the upper jacket, to prevent retraction of the upper jacket beyond the first retraction limit when the electromechanical blocking element is in the extended position.

2. The stow release assembly of claim 1, further comprising a second wall, engagement of the electromechanical blocking element with the second wall defining the fully extended position.

3. The stow release assembly of claim 1, further comprising a third wall, the electromechanical blocking element selectively engageable with the third wall to prevent retraction of the upper jacket beyond the second retraction limit when the electromechanical blocking element is in the extended position.

4. The stow release assembly of claim 1, wherein the electromechanical blocking element fixing the upper jacket in at least one position between the first retraction limit and the second retraction limit.

5. The stow release assembly of claim 1, wherein the component operatively coupled to the upper jacket is an energy absorption strap.

6. The stow release assembly of claim 1, wherein the upper jacket is coupleable to a steering input device, the steering device switchable between a rotatable condition and a non-rotational condition in at least one position along the first translation range.

7. The stow release assembly of claim 1, wherein the upper jacket is coupleable to a steering input device, the steering device switchable between a rotatable condition and a non-rotational condition in at least one position along the second translation range.

8. The stow release assembly of claim 1, wherein the electromechanical blocking element is spring biased toward the extended position.

9. A stow release assembly for a manually translatable steering column assembly comprising:
   an upper jacket;
   a lower jacket, the upper jacket translatable relative to the lower jacket, the upper jacket translatable between a retracted range and a stowed range; and
   an electromechanical blocking element coupled to a stationary component of the steering column assembly and moveable between an extended position and a retracted position, the electromechanical blocking element selectively preventing translation of the upper jacket at a plurality of translation positions, wherein the plurality of translation positions comprises a fully extended position, a first retraction limit and a second retraction limit, the fully extended position and the first retraction limit defining a first telescope range, the first retraction limit and the second retraction limit defining a second telescope range.

10. The stow release assembly of claim 9, further comprising an energy absorption strap operatively coupled to the upper jacket, the energy absorption strap having first wall selectively engageable with the electromechanical blocking element to define the first retraction limit.

11. The stow release assembly of claim 9, further comprising a second wall of the energy absorption strap, engagement of the electromechanical blocking element with the second wall defining the fully extended position.

12. The stow release assembly of claim 9, further comprising a third wall of the energy absorption strap, the electromechanical blocking element selectively engageable with the third wall to prevent retraction of the upper jacket beyond the second retraction limit when the electromechanical blocking element is in the extended position.

\* \* \* \* \*